(12) United States Patent
Weindorf et al.

(10) Patent No.: US 9,633,626 B2
(45) Date of Patent: Apr. 25, 2017

(54) ADJUSTING AN ELECTRONIC DISPLAY BASED ON GAZE TRACKING

(71) Applicants: Paul Fredrick Luther Weindorf, Novi, MI (US); Shadi Mere, Ann Arbor, MI (US); Paul O. Morris, Ann Arbor, MI (US)

(72) Inventors: Paul Fredrick Luther Weindorf, Novi, MI (US); Shadi Mere, Ann Arbor, MI (US); Paul O. Morris, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 105 days.

(21) Appl. No.: 14/656,288

(22) Filed: Mar. 12, 2015

(65) Prior Publication Data
US 2016/0267875 A1 Sep. 15, 2016

(51) Int. Cl.
  *G09G 5/10* (2006.01)
  *G06K 9/00* (2006.01)
  *G09G 5/00* (2006.01)

(52) U.S. Cl.
  CPC ........... *G09G 5/10* (2013.01); *G06K 9/00604* (2013.01); *G09G 5/00* (2013.01); *G09G 2320/0626* (2013.01); *G09G 2354/00* (2013.01); *G09G 2360/144* (2013.01); *G09G 2380/10* (2013.01)

(58) Field of Classification Search
  CPC .......... G09G 3/06; G09G 3/22; G09G 3/3406; G09G 2320/0285; G09G 2320/0626; G09G 2320/066; G09G 2360/144; G06F 3/013; G02B 27/01; G02B 2027/0118; B60Q 3/00; B60Q 3/048; B60K 2350/203; B60K 2350/2069
  See application file for complete search history.

(56) References Cited

U.S. PATENT DOCUMENTS

| | | | | |
|---|---|---|---|---|
| 5,016,282 A | * | 5/1991 | Tomono | G06F 3/013 382/117 |
| 5,883,605 A | | 3/1999 | Knapp | |
| 6,008,781 A | * | 12/1999 | Furness, III | G02B 27/017 345/8 |

(Continued)

FOREIGN PATENT DOCUMENTS

| WO | 2013/167466 A2 | 11/2013 |
|---|---|---|
| WO | 2013/167466 A3 | 11/2013 |

OTHER PUBLICATIONS

"Standard Metrology for Vehicular Displays" SAE International, Jul. 2002, Revised Apr. 2007, pp. 1-27, J1757-1, Available online at www.cie.co.at.

(Continued)

*Primary Examiner* — Joe H Cheng
(74) *Attorney, Agent, or Firm* — Dickinson Wright PLLC

(57) ABSTRACT

A system for adjusting an electronic display is provided herein. The system includes a gaze tracking device to capture an image of a pupil associated with a viewer of the electronic display, and a diameter of the pupil being ascertained via the image of the pupil. In another example, the system may also include an ambient light sensor receiver to logarithmically receive light information from an ambient light sensor; and a display adjuster to adjust a luminance of the electronic display based on a combination of a diameter and the light information.

8 Claims, 12 Drawing Sheets

(56) References Cited

U.S. PATENT DOCUMENTS

| | | | |
|---|---|---|---|
| 6,479,810 B1 | 11/2002 | Weindorf | |
| 6,483,245 B1 | 11/2002 | Weindorf et al. | |
| 6,507,286 B2 | 1/2003 | Weindorf et al. | |
| 6,750,832 B1* | 6/2004 | Kleinschmidt | B60K 35/00 345/7 |
| 6,762,741 B2 | 7/2004 | Weindorf | |
| 8,472,120 B2* | 6/2013 | Border | G02B 27/0093 353/28 |
| 8,970,451 B2* | 3/2015 | Nagasawa | B60K 35/00 345/7 |
| 9,076,248 B2* | 7/2015 | Tasaki | B60K 35/00 |
| 9,267,808 B2* | 2/2016 | Nagasawa | G01C 21/3602 |
| 2003/0012425 A1* | 1/2003 | Suzuki | G02B 27/0093 382/154 |
| 2007/0159599 A1* | 7/2007 | Yamada | G02B 27/0093 351/211 |
| 2009/0005961 A1* | 1/2009 | Grabowski | G01C 21/365 701/532 |
| 2013/0076883 A1* | 3/2013 | Madau | B60K 35/00 348/78 |
| 2013/0194244 A1* | 8/2013 | Tamir | G09G 5/10 345/207 |
| 2014/0191927 A1 | 7/2014 | Cho | |
| 2015/0002554 A1* | 1/2015 | Kupershmidt | G09G 3/3208 345/690 |
| 2015/0260995 A1* | 9/2015 | Mukawa | G02B 27/0172 345/8 |

OTHER PUBLICATIONS

"Road vehicles—Ergonomic aspects of transport information and control systems—Specifications and test procedures for in-vehicle visual presentation" International Standard, Feb. 15, 2009 (second edition), pp. 1-18, ISO 15008 (Ref. No. ISO 15008:2009(E)), Switzerland.

"Ergonomic requirements for work with visual displays based on flat-panels—Part 2: Ergonomics requirements for flat panel displays," International Standard, Dec. 1, 2001(first edition), pp. 1-148. ISO 13406-2 (Ref. No. ISO 13406-2:2001(E)), Switzerland.

Silverstein et al., "The Development and Evaluation of Color Systems for Airborne Applications—Fundamental Visual, Perceptual, and Display Systems Considerations," SAE International, Oct. 14, 1985, pp. 241-365, Paper No. 851774.

"IDMS Download Page,"The Society for Information Display (SID), Mar. 31, 2015, pp. 1-3, available online at http://www.sid.org/Publications/ICDM/oldIDMSLicenseamp;Download.aspx.

Watson, Andrew B. et al, "A unified formula for light-adapted pupil size," Journal of Vision, Sep. 25, 2012, pp. 1-16, 12(10);12, available online at http://www.journalofvision.org/content/12/10/12.

* cited by examiner

| GF | ΔN |
|---|---|
| 0.027973 | -10 |
| 0.04 | -9 |
| 0.057199 | -8 |
| 0.081792 | -7 |
| 0.116961 | -6 |
| 0.16725 | -5 |
| 0.239163 | -4 |
| 0.341995 | -3 |
| 0.489043 | -2 |
| 0.699316 | -1 |
| 1 | 0 |
| 1.429969 | 1 |
| 2.044812 | 2 |
| 2.924018 | 3 |
| 4.181255 | 4 |
| 5.979066 | 5 |
| 8.54988 | 6 |
| 12.22606 | 7 |
| 17.48289 | 8 |
| 25 | 9 |
| 35.74923 | 10 |

FIG. 7

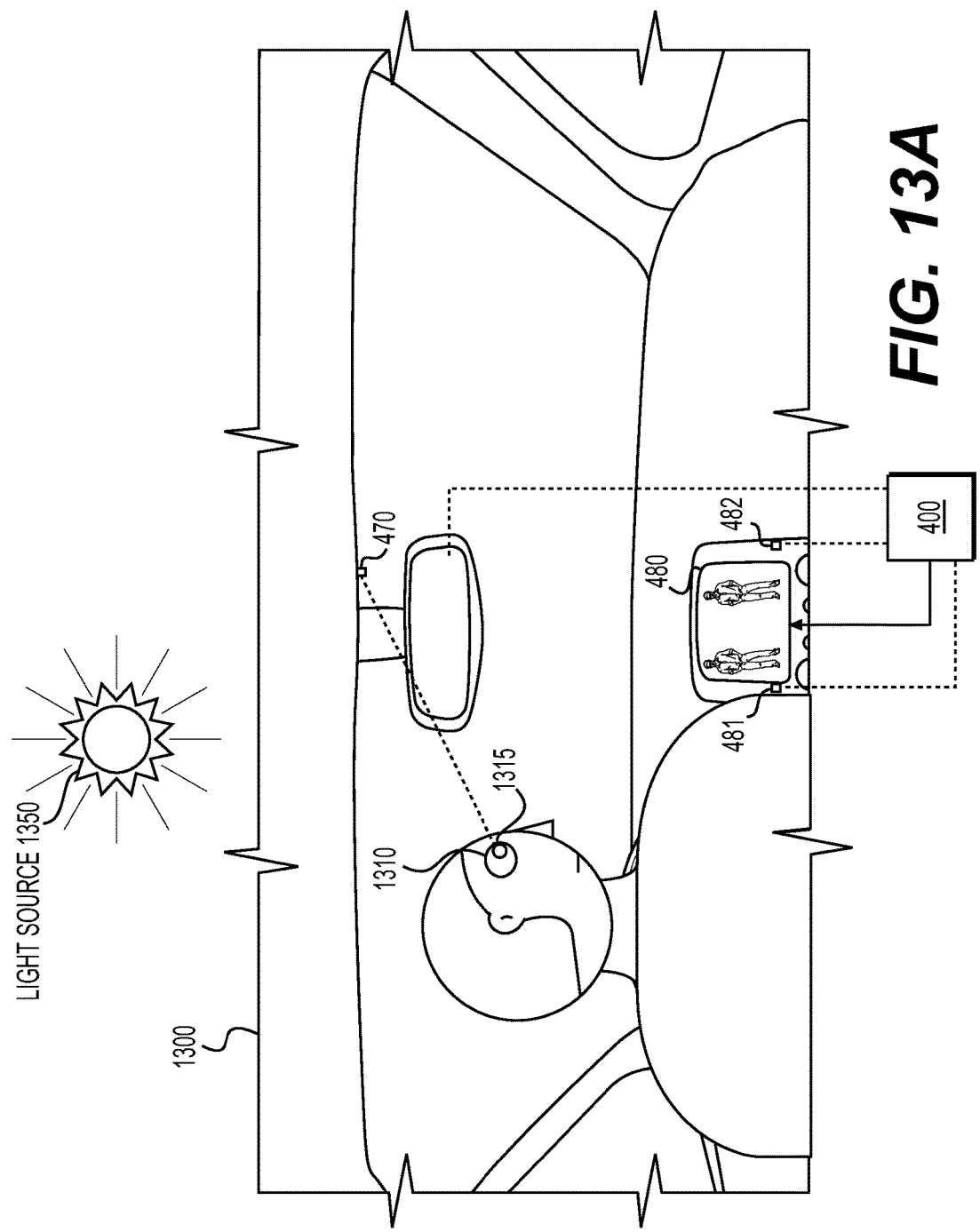

ADJUSTING AN ELECTRONIC DISPLAY BASED ON GAZE TRACKING

BACKGROUND

Electronic displays facilitate the reproduction of data on a lighted platform. Driving circuitry is employed to manipulate lighted elements to render the information being displayed. The viewer may gaze upon the display and view the lighted elements to process and consume the information.

However, because light is employed to convey the electronic information, the viewing experience is affected by the environment in which the electronic display is implemented in. For example, if the electronic display is an awkward or inconvenient location, viewing the electronic display may be ultimately frustrated.

Further, the environment around the electronic display may be dynamic and changing. For example, if the electronic display is implemented in an area that interacts with outside or external light providing sources, the electronic display's ability to convey information via the lighted elements may be obstructed or modified.

A measure of unit for determining the intensity of light being transmitted or propagated in a specific direction is known as luminance. Various units may be employed to measure luminance, such as a candela per square meter. One of ordinary skill in the art may appreciate that several units or types of measurements may be employed for luminance measurement.

For example, if an electronic display is implemented in a vehicle, the electronic display may interact with the outside lighting environment. Thus, several factors may be present with the exterior lighting to affect the display's ability to provide a clear display in an optimal fashion. For example, the exterior lighting may be affected by the cloud cover, the weather, the road (e.g. if the vehicle is in a tunnel), the time of day, or the like.

Thus, an electronic display may be aided greatly by an ability to be cognizant of the exterior lighting conditions. Based on the knowledge of the exterior lighting conditions, the electronic display may adjust the display luminance accordingly.

One such example of a system for adjusting display luminance is shown in FIG. 1. FIG. 1 illustrates an example of a system 100 for adjusting display luminance according to a conventional implementation. Because the system 100 is known in the prior art, a detailed explanation will be omitted. System 100 is referred to as a linear light system. Linear light systems may not work over specific dynamic ranges, such as 6-8 decades. Over these dynamic ranges, an analog-to-digital converter may be inadequate.

FIG. 2 illustrates an example of a process for determining ambient display background luminance (DBL). Referring to FIG. 2, with the aspects shown, if various factors are known, such as a reflection coefficient or luminance level, the DBL may be calculated.

As shown in FIG. 2, various component reflection coefficients (R1 . . . Rn) are associated with luminance factors. These luminance factors may be employed to determine the DBL.

The aspects shown in FIG. 2, may be employed with conventional systems for ambient luminance detection. For example, in the vehicular context, the following factors may be sensed, the lambertian diffuse, specular, and haze diffuse.

FIG. 3(a) illustrates an example of how reflection of light onto an electronic display 300 may be measured via a light receiving source (i.e. one eyes) 310. Referring to FIG. 3(a), a point source 320 generates light 325 onto a display 300. The display 300 reflects the light 325 onto a light receiving source 310, via an angle 315. Employing mathematical relationships known to one of ordinary skill in the art, a reflection factor $\beta$, the angle 315, a system may determine the ambient light caused by reflection off a display.

FIG. 3(b) indicates a luminance graph 350 with source inclinations relative to a specular direction (angle 315). The y-axis, and the ranges provided indicate an associated effect that may cause various luminance modifications at different angles.

The various affects shown in FIG. 3(b) may cause the viewer of the electronic display 300 to see various background luminance (DBL). Thus, as the DBL increases, the luminance of the display may increase at a corresponding amount to counteract the DBL effects.

In order to understand how to adjust display luminance, the Silverstein relationship is provided (as explained in several references submitted). The equation described below describes a relationship between the detect DBL and the luminance to be employed in a display.

$$ESL = B_O(DBL)^c$$

the terms being defined as:
ESL=Emitted Symbol Luminance in cd/m²
$B_O$=Luminance Offset Constant
DBL=Various Display Background Luminance in cd/m²
c=Power Constant (slope of the power function in logarithmic coordinates).

With cathode ray tubes (CRT) display technologies, phosphor reflectance does not change as a function of phosphor light emission. A liquid crystal display (LCD) presents a different challenge due to the "on" and "off" state each LCD cell experiences. Thus, variations of the Silverstein relationship may be calculated for LCD displays. However, by employing the DBL relationship above, the display visibility may be greatly improved.

In addition, various other factors employing the Silverstein methodology may be employed. For example, the gain correction factor (GF) may be calculated, which employs a forward looking light sensor.

However, the existing logarithmic sensors to compensate for light adaptation effects may be incompatible with the Silverstein methodology (which is designed an optimized for linear light sensing). Thus, employing a logarithmic light sensor in a display adjustment system may ultimately be frustrated.

An interface allows engagement with an electronic system coupled to the electronic display. A detection of an input from the interface may cause an action via the electronic system, which is subsequently shown on the electronic display. Interfaces have become more complex as well. Conventionally, interfaces were implemented with physical input devices, such as a keyboard, manual knob, or the like.

In modern implementations, the interface devices have become more robust and non-contact based. For example, an interface device may allow engagement via a tracking technique facilitated by a monitoring device (such as a camera, a video capturing device, a motion detector, or the like).

One such implementation is a gaze tracking device. A gaze tracking device employs a camera that captures a person's eye (or eyes), and allows for detection of eye movement to control various elements of an electronic display. For example, in one instance, if a detection is made that a person's eyes are focused on a specific area of the electronic display, the electronic display may zoom in or out accordingly.

Thus, electronic displays, systems, and the like, are being implemented along with gaze tracking devices to facilitate control and interactivity. For example, a gaze tracking system may be implemented in a vehicle by installing a camera in an area where the person interacting with the electronic display or system is staring at while interacting with the electronic display or system. In the vehicle context, the camera may be mounted in a dashboard, a vehicle's roof, or anywhere capable of capturing the gaze of a user.

DESCRIPTION OF THE DRAWINGS

The detailed description refers to the following drawings, in which like numerals refer to like items, and in which:

FIG. 7 illustrates an example of a GF table of FIG. 6.

SUMMARY

Figure 1:
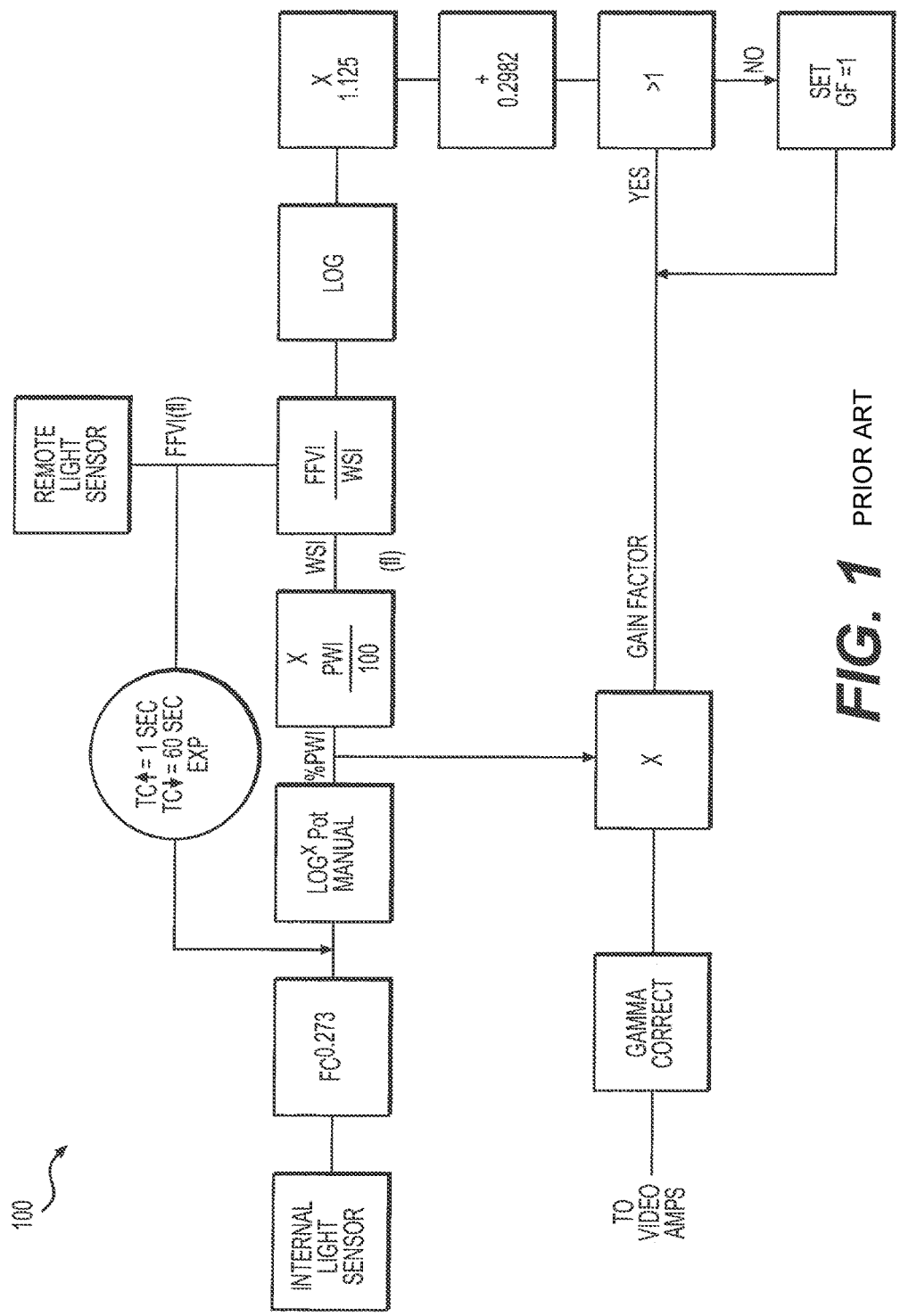
FIG. 1 illustrates an example of a system for adjusting display luminance according to a conventional implementation.
Figure 2:
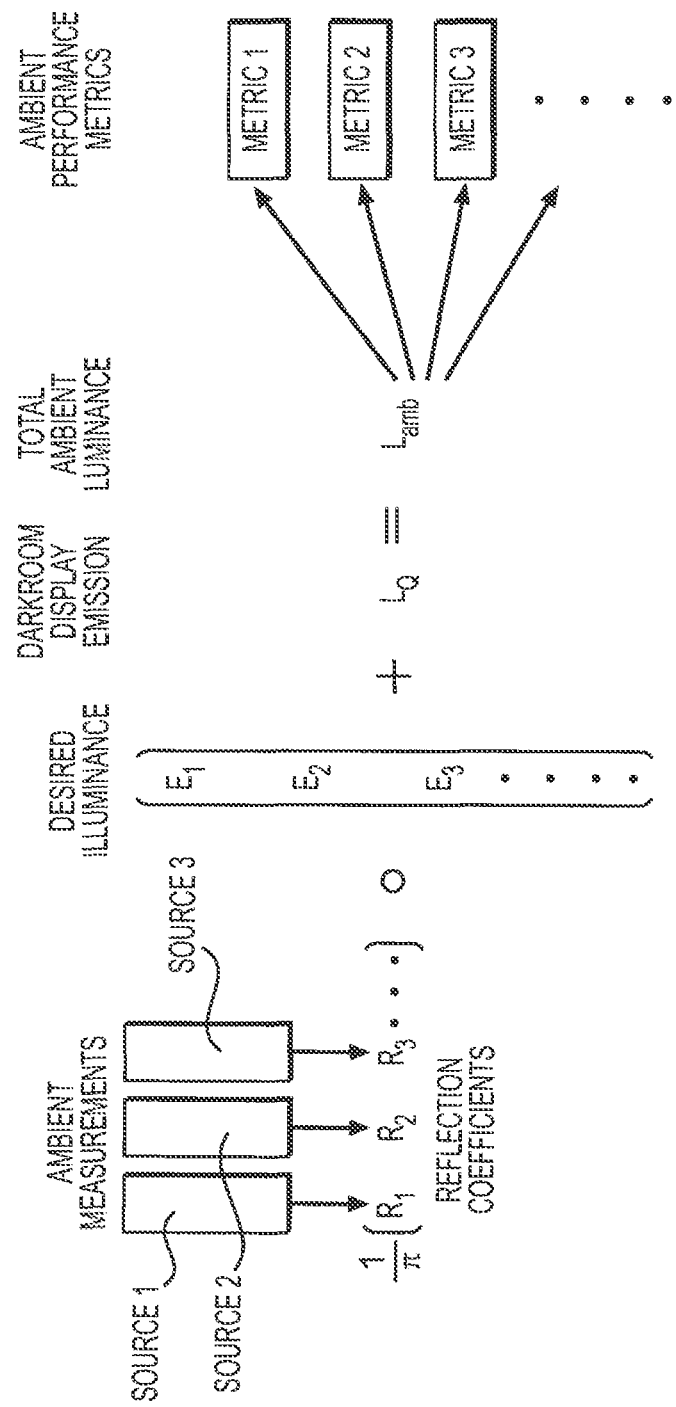
FIG. 2 illustrates an example of a process for determining ambient display background luminance (DBL).
Figure 3B:
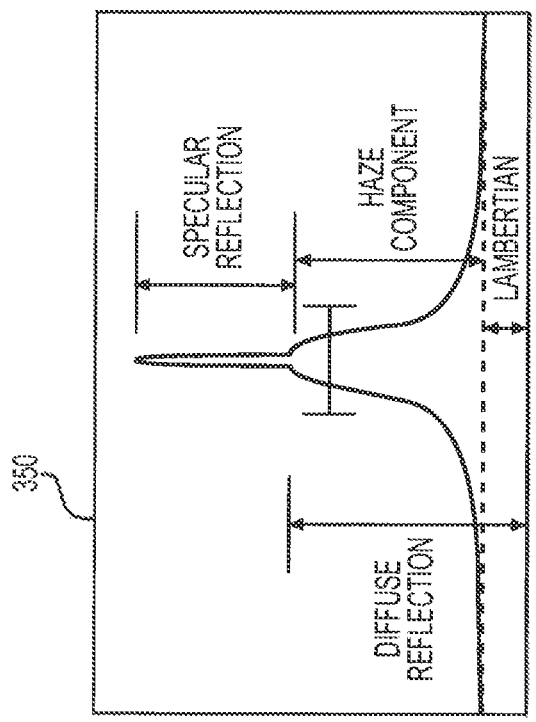
FIG. 3(b) indicates a luminance graph with source inclinations relative to a specular direction.
Figure 3A:
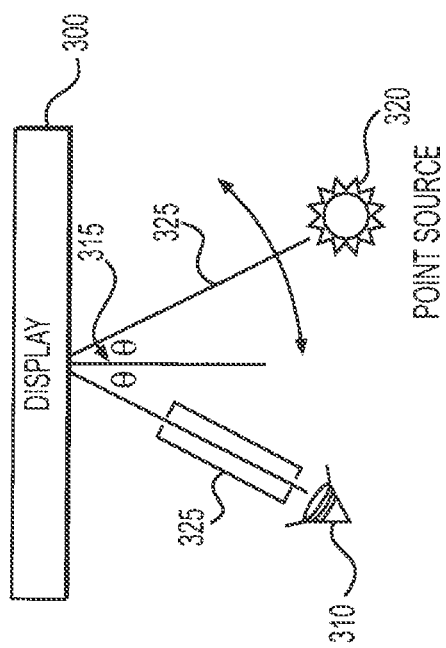
FIG. 3(a) illustrates an example of how reflection of light onto an electronic display may be measured via a light receiving source.

A system for adjusting an electronic display is provided herein. The system includes a gaze tracking device to capture an image of a pupil associated with a viewer of the electronic display, and a diameter of the pupil being ascertained via the image of the pupil. In another example, the system may also include an ambient light sensor receiver to logarithmically receive light information from an ambient light sensor; and a display adjuster to adjust a luminance of the electronic display based on a combination of a diameter and the light information.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Electronic displays employ lighting to convey information to a viewer. As explained in the Background section, the lighting is often interfered with due to environmental conditions, such as ambient light or weather conditions. In these situations, the viewing experience may be affected by the environmental conditions, and thus, be perturbed.

Various techniques have been disclosed that allow the lighting to be adjusted. However, these techniques are either limited by the ranges or the dynamic abilities they provide.

In one such implementation, ambient light is detected, and the display is modified or adjusted accordingly. With these sensors, which may be situated on the electronic display, the light affecting the electronic display is employed to modify or adjust the display.

However, this light does not encompass all the external lighting that may be affecting a viewing of an electronic display. For example, the viewer's eye may be affected by the lighting condition experienced via external lighting sources (i.e. the sun, etc). In these situations, the solar lighting may cause the viewer's pupil to process and view the electronic display in a different manner.

As illustrated in the Background section and in other techniques, an approximation employing a linear forward looking light sensor has been proposed. This methodology may not work effectively because of the limitation in range associated with linear light sensing. The linear forward looking light sensor services a range that does not adequately cover the amount of detection necessary to successfully implement a technology to adjust the electronic display.

Disclosed herein are methods, systems, and devices for adjusting an electronic display based on gaze tracking. The aspects disclosed herein allow for the employment of an ambient light sensor combined with a gaze tracking device to effectively adjust an electronic display system. The adjustment may be directed to adjusting a luminance associated with the display. The various methodologies and components discussed herein facilitate a system rendering or driving an electronic display to adjust light levels in a manner that allows for a dynamic response to environmental concerns with the implementation of a display system.

For example, if the electronic display is implemented in a vehicle, a gaze tracking device, an ambient light sensor, and system for integrating data from both may allow a viewer of the electronic display system to achieve a better and safer driving system.

The aspects disclosed herein employ a vehicle display system for explanatory purposes. However, one may implement the aspects disclosed herein in other contexts that employ both a gaze tracking device and an ambient light sensor.

The ambient light sensors in the implementations described below are logarithmic. The employment of a logarithmic light sensor allows for a dynamic range to be represented.

One advantage to the aspects disclosed herein is that many systems already employ gaze tracking devices. Thus, by incorporating the gaze tracking device to aid and augment in adjusting a luminance of an electronic display, pre-existing interface technologies may effectively be conserved.

Figure 4:
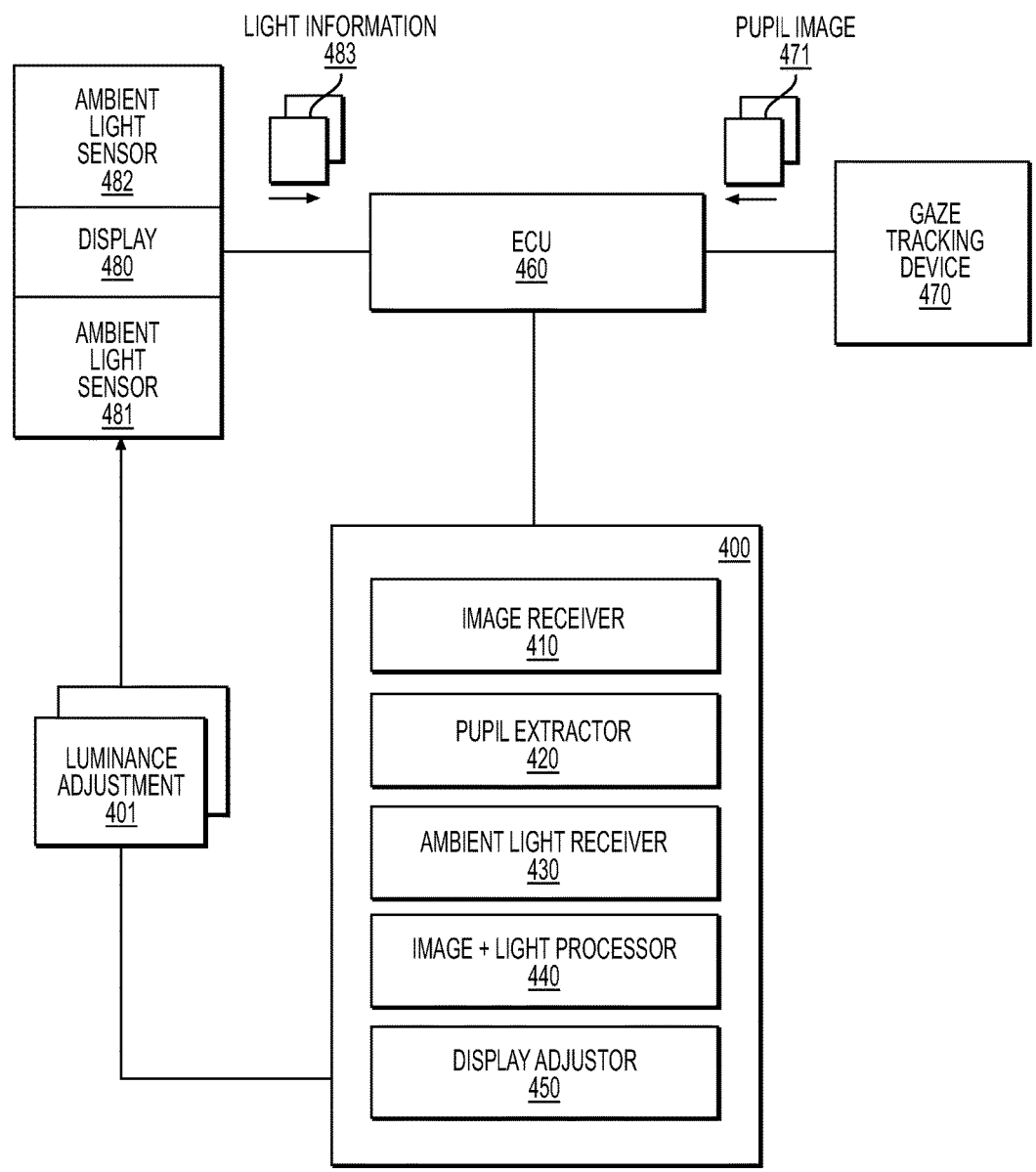
FIG. 4 illustrates an example of implementation of a system for adjusting an electronic display based on a gaze tracking device.

FIG. 4 illustrates an example of implementation of a system 400 for adjusting an electronic display 480 based on a gaze tracking device 470.

The gaze tracking device 470 may be any sort of gaze tracking circuit or system employed to monitor a person's eyes to detect information via the person's gaze. The gaze may be translated to a data file, which is represented by pupil image 471.

Referring to FIG. 4, an electrical control unit (ECU) 460 is shown providing electrical connectivity between all of the elements. The ECU 460 is commonly implemented in locations, such as a vehicle, to provide a technique for electrical components to connect to each other (either wired or wirelessly), in a seamless manner.

The ECU 460 is a general term for a processor or non-transitory computer readable medium for the facilitation of receiving, processing, and transmission of electrical signals. As stated above, the ECU 460 may be implemented in a vehicle. In automotive electronics, electronic control unit (ECU) is a generic term for any embedded system that controls one or more of the electrical system or subsystems in a motor vehicle. Numerous of the examples provided below are shown in the context of a vehicle. However, it will be noted that the concepts described herein may be applied to various situations, and not limited to those in the vehicular context.

The display 480 is an electronic display that receives information to display. The information may be any sort of information associated with the processing of information by a user or person gazing onto or around the display 480. The display 480 is associated with ambient light sensors 481 and 482. Ambient light sensors 481 and 482 are employed to detect light or brightness in a similar way as the human eye. They are used wherever the settings of a system have to be adjusted to the ambient light conditions as perceived by humans. The number of light sensors employed is exemplary. The actual number may be an implementation choice by the installer of the setup shown in FIG. 4. The display 480 is coupled to the ECU 460 (along with the ambient light sensors 481 and 482).

As shown in FIG. 4, light information 483 from the ambient light sensors is transmitted to the ECU 460, which propagates the information to the system 400.

The system 400 includes an image receiver 410, a pupil extractor 420, an ambient light receiver 430, an image+light processor 440, and a display adjustor 450. The system 400 may be embedded into a central processor, such as the ECU 460, or alternatively, may be packaged as a stand-alone component, with the requisite circuitry included.

The image receiver 410 receives the pupil image 471 from the gaze tracking device 470 (for example, via the ECU 460). The image receiver 410 may be configured to receive the pupil image 471 in numerous formats known in the field of image storage and transmission. The image 471 may be a picture of the face associated with person gazing onto a display 480, the eyes, the pupils (or single pupil), or the like. The image 471 may be any indicia associated with the person, as long as at least one pupil is captured.

The pupil extractor 420 extracts a pupil(s) of the pupil image 471. Once the pupil (or pupils) is obtained, a diameter associated with the pupil may be determined. In another example, the image receiver 410 and pupil extractor 420 may be differently implemented with a receiving of the pupil diameter directly.

Figure 5:
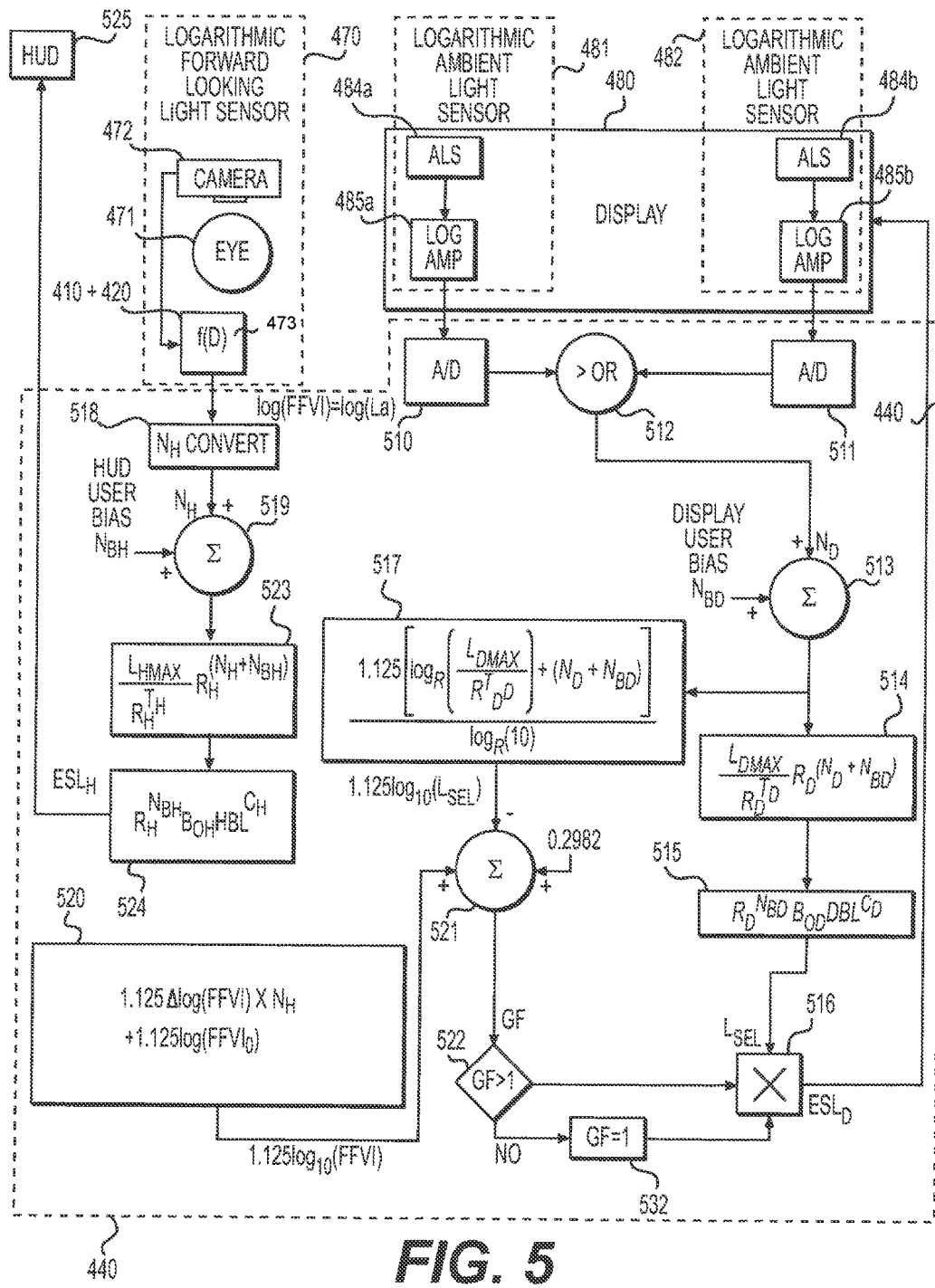
FIG. 5 illustrates an example of the image+light processor as described in system of FIG. 4.

The ambient light receiver 430 receives the light information 483 from the ambient light sensor 481 and 482. The light information 483 may be received logarithmically. FIG. 5 illustrates an example of an ambient light sensor employing logarithmic sensing.

The image+light processor 440 combines the information obtained by the pupil extractor 420 and the information obtained by the ambient light receiver 430 to produce an adjustment 401. The adjustment 401 may be communicated, via the display adjustor 450 to the display 480. Examples of the image+light processor 440 are described below via FIGS. 5, 6, and 8.

FIG. 5 illustrates an example of the image+light processor 440 as described in system 400. The elements employed with the block level diagram may be implemented in any sort of circuit or encoded based logic, such as those enumerated below.

Referring to FIG. 5, the sensors 481 and 482 each include an actual sensor circuit 484a and 484b, as well as an amplifier 485a and 485b. The voltage produced by each amplifier is output to an analog-to-digital converter (A/D), such as those shown in FIG. 5 (A/D 510 and A/D 511). The following equation may be employed to define the voltage input into A/D 510 and A/D 511:

$$V_{OALS} = A_V V_T \ln\left(\frac{i_{ALS}}{I_{2ALS}}\right) + V_{ThALS}$$

The digital conversion is represented by the following equation:

$$ADC_{ALS} = \frac{(2^{N_{A'DALS}} - 1)}{V_{ADCALS}} \left[ A_V V_T \ln\left(\frac{i_{ALS}}{I_{2ALS}}\right) + V_{ThALS} \right]$$

The above-identified equations (the terms, definition of the constants, and the derivation) are found in references submitted along with this application, and thus, a full explanation is omitted for brevity.

The output of the A/D blocks may be employed to drive the display adjustor 450 (and thus, adjust the lighting of the display 480). However, the values may be employed as described below to adjust the display 480 in another way.

The combination of the output of the A/D blocks 510 and 511 may be performed by the combination circuit 512. The output may be converted to a variable $N_D$, and summed 513 with a user bias ($N_{BD}$). $N_D$ and $N_{DB}$ may be obtained through a predefined relationship or expression.

The following relationship describes the $L_{sel}$ value. The $L_{sel}$ value is the desired display luminance, and may be determined by populating a lookup table based on various constant step ratios R. If the constant step ratio is used, $N_D$ value, and the $N_{BD}$ value may employed to determine the Lsel value. $N_D$ is used and derived by the A/D output, and $N_{BD}$ may be obtained by a user offset or bias. This definition is described in the references disclosed, and is listed as (514):

$$L_{SEL} = \frac{L_{Max}}{R_D^{T_D}} R^{(N_D + N_{BD})}$$

The logarithmic expression of the above-described relationship is defined by the following (515):

$$\log_R(L_{SEL}) = \log_R\left(\frac{L_{Max}}{R_D^{T_D}}\right) + (N_D + N_{BD})$$

The output of element 513 may be propagated to element 517, which is described by the following relationship (517):

$$\log_b(x) = \frac{\log_d(x)}{\log_d(b)}$$

$$\log_{10}(L_{SEL}) = \frac{\log_R\left(\frac{L_{Max}}{R_D^{T_D}}\right) + (N_D + N_{BD})}{\log_R(10)}$$

The output of element 517 is the log of the $L_{sel}$ value, and it may be multiplied by a FIG. 1.125.

The gaze tracking device 470 includes a camera 472. The camera may be equipped to take a picture of an eye 471. The pupil extractor 420 may be configured to extract a pupil diameter, and this may be propagated to element 518.

Element 518 may be configured to convert the received diameter to an $N_H$ value.

In element 520, the following equation is produced:

$$1.125 \log_{10}(FFVI) = 1.125\Delta \log(FFVI) \times N_H + 1.125 \log(FFVI_0)$$

The output of 520, may be summed with the output of 517 and a constant with the following expression (521):

$$GF = 1.125\log\left(\frac{FFVI}{WSI}\right) + 0.2982$$
$$= 1.125\log_{10}\left(\frac{FFVI}{L_{SEL}}\right) + 0.2982$$
$$= 1.125\log_{10}(FFVI) - 1.125\log_{10}(L_{SEL}) + 0.2982$$

The embodiment described above is primarily for employment with a digital display, such as display 480. In another example, the information may be employed to determine an adjustment associated with a heads-up display (HUD) 525. The $N_H$ value may be summed 519 with a user bias value ($N_{BH}$), and propagated to element 523. The manipulations shown in elements 523 and 524 may be employed to perform an adjustment of the HUD 525.

The GF is a gain factor, and may be employed to adjust the display 480. If the GF is less than 1 (522), the GF is set to 1 (532), and the $L_{sel}$ value as calculated by element 515 is employed to adjust the display 480.

If greater than 1 (522), then the $L_{SEL}$ value from 515 could be multiplied (516) or the following techniques may be employed (employing a lookup table), to determine a GF to adjust the display 480. Another way to determine the gain factor is to employ a look up table based on a step ratio relationship.

$$L_{SEL} = \frac{L_{Max}}{\left[\frac{L_{Max}}{L_{Min}}\right]^{\left(\frac{T-N_S}{T-1}\right)}}$$

Where:
c=Silverstein power constant
T=Total number of luminance steps
$L_{Max}$=Maximum luminance level
$L_{Min}$=Minimum luminance level $$L_{GF} = GF \times L_{SEL}$$

In order to solve for a step number $N_{GF}$ (to be employed via a lookup table), the following relationship is set up to derive this value:

$$L_{GF} = \frac{L_{Max}}{\left[\frac{L_{Max}}{L_{Min}}\right]^{\left(\frac{T-N_{GF}}{T-1}\right)}}$$

Substituting the above equations produces the following expression:

$$GF = \frac{\left[\frac{L_{Max}}{\left[\frac{L_{Max}}{L_{Min}}\right]^{\left(\frac{T-N_{GF}}{T-1}\right)}}\right]}{\left[\frac{L_{Max}}{\left[\frac{L_{Max}}{L_{Min}}\right]^{\left(\frac{T-N_S}{T-1}\right)}}\right]}$$

A simplification of the above is produced below:

$$GF = \frac{\left[\frac{L_{Max}}{L_{Min}}\right]^{\left(\frac{T-N_S}{T-1}\right)}}{\left[\frac{L_{Max}}{L_{Min}}\right]^{\left(\frac{T-N_{GF}}{T-1}\right)}}$$

And:

$$GF = \left[\frac{L_{Max}}{L_{Min}}\right]^{\left[\left(\frac{T-N_S}{T-1}\right) - \left(\frac{T-N_{GF}}{T-1}\right)\right]}$$

Further:

$$GF = \left[\frac{L_{Max}}{L_{Min}}\right]^{\left[\frac{N_{GF}-N_S}{T-1}\right]}$$

If the natural log of both sides of the above equation are taken, the following relationship is established:

$$\ln(GF) = (N_{GF} - N_S)\ln\left(\left[\frac{L_{Max}}{L_{Min}}\right]^{\left(\frac{1}{T-1}\right)}\right)$$

A luminance ratio is defined as such:

$$R_D = \left[\frac{L_{Max}}{L_{Min}}\right]^{\left(\frac{1}{T-1}\right)}$$

Thus, substituting the above relationship into the formula derived leads to relationship:

$$(N_{GF} - N_S) = \Delta N = \frac{\ln(GF)}{\ln(R_D)}$$

The importance of the above set of equations shows that an ambient light sensor step level (which is a term known in the art relating to Silverstein's methodologies, which are submitted herein), is not vital to determining the GF above. The ΔN method described above is capable of being employed for the described adjustment because the various steps associated with the ΔN are associated with display output luminance ratios.

Figure 6:
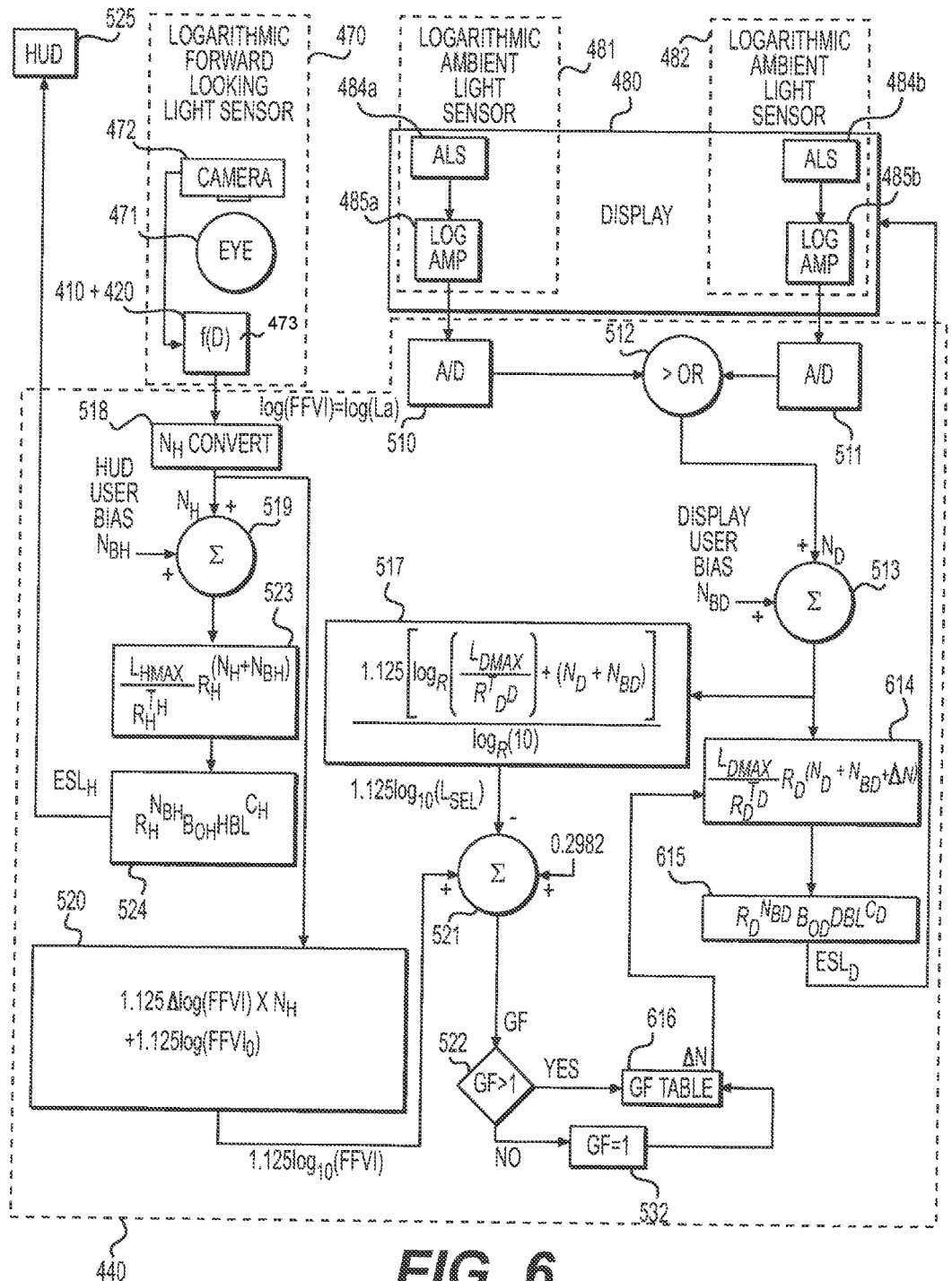
FIG. 6 illustrates another example implementation of the image+light processor of the system shown in FIG. 4.

FIG. 6 illustrates another example implementation of the image+light processor 440 described in the system 400. As shown, the multiplier 516 is obviated. Instead, a GF table 616 is implemented. The GF table 616 output may be propagated to the new elements 614 and 615, which are modified to incorporate the ΔN factor, and employed calculate a luminance adjustment 401 employed for display 480.

FIG. 7 illustrates an example of a GF table 616. The GF table 616 correlates each GF number with a ΔN. The ΔN retrieved may accordingly be employed with the expressions discussed in FIG. 6. The GF table 616 is exemplary for a specific set of parameters and values. The example table is based on parameters like T=10, Lmax=2000 and Lmin=80.

Figure 8:
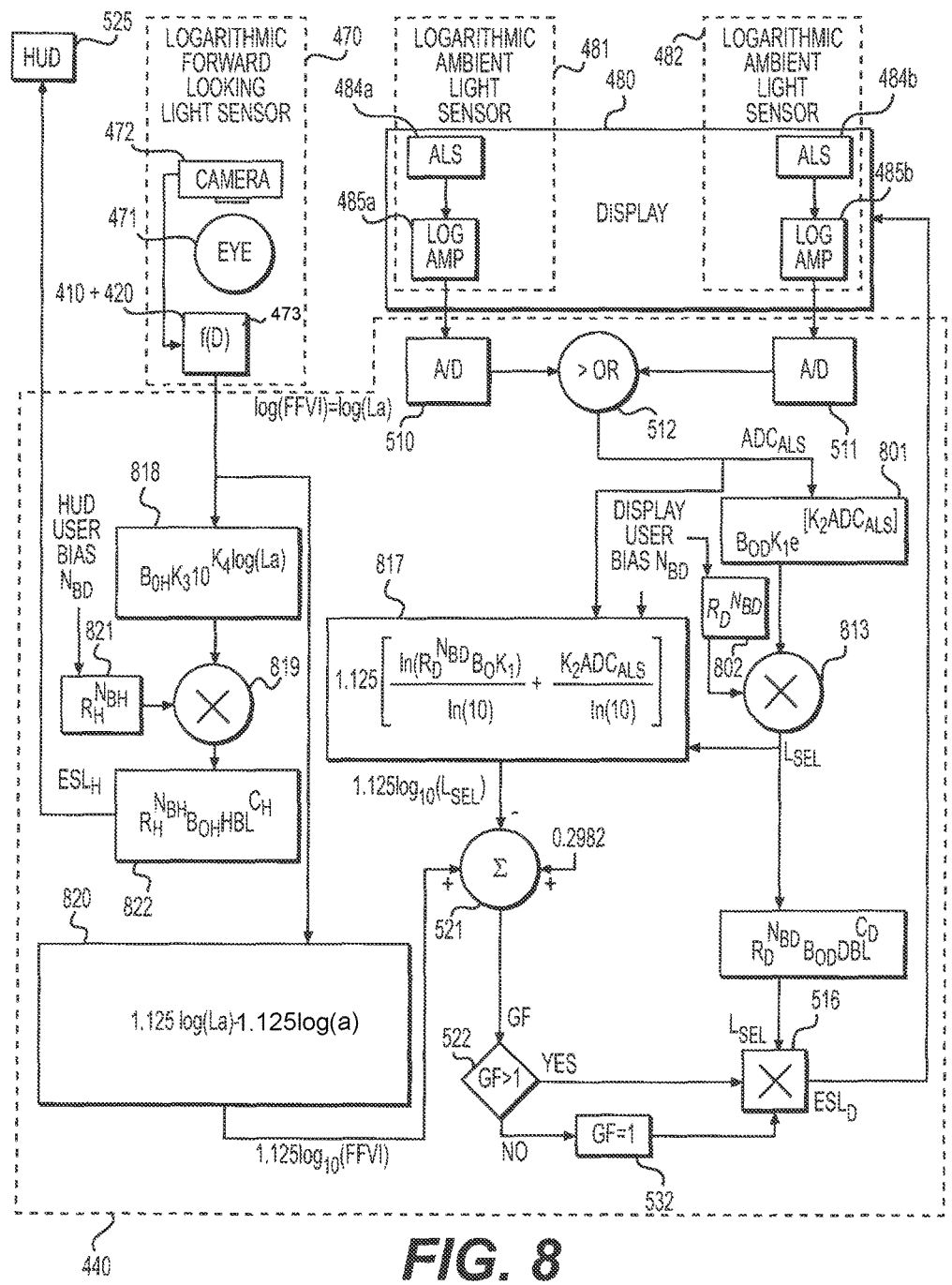
FIG. 8 illustrates another example of the implementation of the image+light processor of the system shown in FIG. 4.

FIG. 8 illustrates another example of the implementation of the image+light processor 440. Specifically, FIG. 8 is a calculation approach instead of using ratio tables as previously described. The implementation in FIG. 8 is similar to the one shown in FIG. 5, in that a processor is employed to combine the $L_{sel}$ value with the gain factor (GF). However, one key difference is that blocks 801, 802, 813, and 817 are introduced. This allows for the avoidance of an implementation of block 514. The following set of equations facilitate the solving of the implementation shown in FIG. 8.

The output of the OR element 512 may produce the following:

$$A_V V_T \ln\left(\frac{i_{ALS}}{I_{2ALS}}\right) = \frac{ADC_{ALS} V_{ADCALS}}{(2^{N_{A'DALS}} - 1)} - V_{ThALS}$$

Which can be manipulated, to produce:

$$\ln\left(\frac{i_{ALS}}{I_{2ALS}}\right) = \frac{ADC_{ALS} V_{ADCALS}}{A_V V_T (2^{N_{A'DALS}} - 1)} - \frac{V_{ThALS}}{A_V V_T}$$

$$\ln(i_{ALS}) - \ln(I_{2ALS}) = \frac{ADC_{ALS} V_{ADCALS}}{A_V V_T (2^{N_{A'DALS}} - 1)} - \frac{V_{ThALS}}{A_V V_T}$$

$$i_{ALS} = I_{2ALS} e^{\left[\frac{ADC_{ALS} V_{ADCALS}}{A_V V_T (2^{N_{A'DALS}} - 1)}\right]} e^{\left[-\frac{V_{ThALS}}{A_V V_T}\right]}$$

$$i_{ALS} = \frac{\pi}{\beta K_P} DBL$$

And solving for the DBL (a term known as evidenced by the submitted papers), leads to the following expression:

$$DBL = \frac{\beta K_P}{\pi} i_{ALS}$$

The following may be employed to produce the expression below:

$$ESL = B_{OD}(DBL)^C$$

$$ESL = B_{OD}\left(\frac{\beta K_P}{\pi}\right)^C (i_{ALS})^C$$

$$ESL = B_{OD}\left(\frac{\beta K_P}{\pi}\right)^C \left(I_{2ALS} e^{\left[\frac{ADC_{ALS} V_{ADCALS}}{A_V V_T (2^{N_{A'DALS}} - 1)}\right]} e^{\left[-\frac{V_{ThALS}}{A_V V_T}\right]}\right)^C$$

$$ELS = B_{OD}\left(\frac{\beta K_P I_{2ALS}}{\pi} e^{\left[-\frac{V_{ThALS}}{A_V V_T}\right]}\right)^C e^{\left[\frac{C \cdot ADC_{ALS} V_{ADCALS}}{A_V V_T (2^{N_{A'DALS}} - 1)}\right]}$$

Because the display may already include a user bias amount, this factor may be introduced with the following expression:

$$L_{SEL} = R_D^{N_{BD}} B_{OD}\left(\frac{\beta K_P I_{2ALS}}{\pi} e^{\left[-\frac{V_{ThALS}}{A_V V_T}\right]}\right)^C e^{\left[\frac{C \cdot ADC_{ALS} V_{ADCALS}}{A_V V_T (2^{N_{A'DALS}} - 1)}\right]}$$

Depending on an implementation of system 400, a constant $K_1$ and $K_2$ may be defined. Thus, the expression above may be simplified to produce the following expression:

$$L_{SEL} = R_D^{N_{BD}} B_{OD} K_1 e^{[K_2 ADC_{ALS}]}$$

Because of an implementation of a logarithmic sensor, the following transformation is also performed:

$$\ln(L_{SEL}) = \ln(R_D^{N_{BD}} B_{OD} K_1) + K_2 ADC_{ALS}$$

$$1.125 \log_{10}(L_{SEL}) = 1.125 \frac{\ln(R_D^{N_{BD}} B_{OD} K_1)}{\ln(10)} + 1.125 \frac{K_2 ADC_{ALS}}{\ln(10)}$$

$$1.125 \log_{10}(L_{SEL}) =$$
$$1.125 \frac{N_{BD} \ln(R_D)}{\ln(10)} + 1.125 \frac{\ln(B_{OD} K_1)}{\ln(10)} + 1.125 \frac{K_2 ADC_{ALS}}{\ln(10)}$$

A similar transformation may be adjusted onto the pathway associated with the gaze tracking device 470. Specifically, the pupil diameter size is propagated to block 820. In an alternate embodiment described below, the data may be employed to directly control a heads-up display (HUD) implementation. Block 820 performs the following manipulation of the data received:

$$1.125 \log_{10}(FFVI) = 1.125 \log(La) - 1.125 \log(a)$$

The output of block 820 is combined in a similar way as described above with the other implementations of the image+light processor 440.

Also shown in FIG. 8 is an implementation to adjust a HUD 525. The information from element 473 is propagated to element 818, and a transformation is produced. From that, a processor is employed via element 819 that combines a user bias from 821 to produces the expression shown in 822. From 822, employing the concepts disclosed herein, a logarithmically transformed pupil diameter (via the expression shown below), is used to adjust a HUD 525.

FIGS. 9-12 illustrate an example for determining a logarithmic function associated with pupil diameter size. Different pupil sizes, along with different factors (i.e. different eye abilities), may correlate to a different amount of luminance noted by the pupil. Accordingly, solving for a curve that relates pupil diameter to an observed luminance may be beneficial for an implementation of the system shown in FIG. 4.

Figure 9:
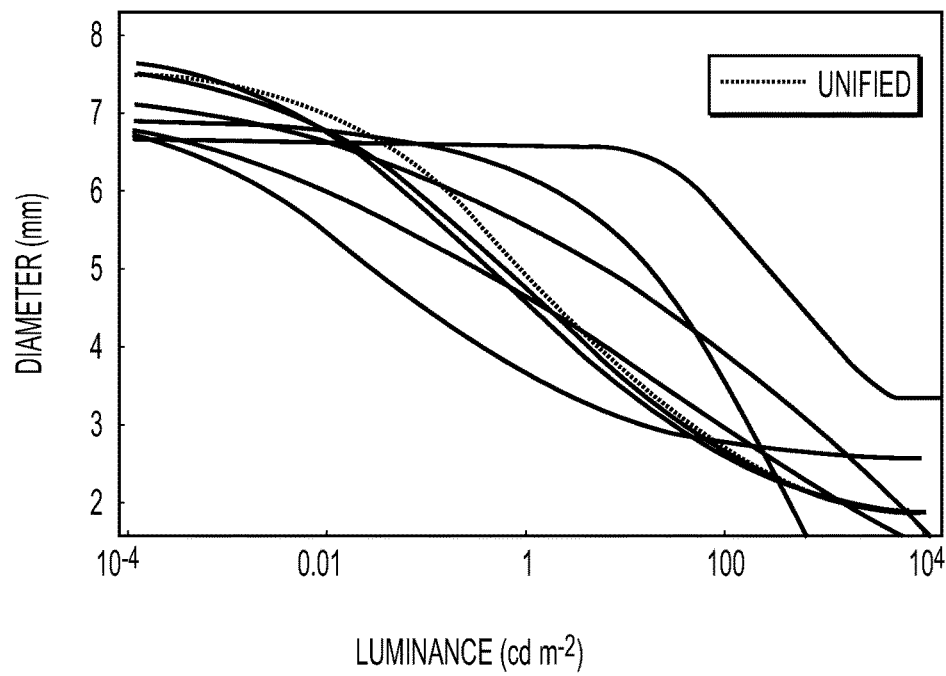
FIGS. 9-12 illustrate an example for determining a logarithmic function associated with pupil diameter size.

In FIG. 9, a unified relationship is shown in relation to various other known relationships proposed. The calculation of which is described in detail below.

The equation, i.e function to solve is proposed with the following relationship:

$$\log(L) = f(D)$$

Where the logarithm of a luminance (log(L)) is what is preferred. The function of the D, where D is the pupil diameter, is what needs to be determined. With a pupil diameter which is responding to both the luminance, L, and the field of view ("a" in degrees), the La product may be solved for by performing the following mathematical manipulations (the relationship below is referred to as the "Stanley Davies" function):

$$D_{SD}(L, a) = 7.75 - 5.75 \left[ \frac{(La/846)^{0.41}}{(La/846)^{0.41} + 2} \right]$$

$$\left[ \frac{(La/846)^{0.41}}{(La/846)^{0.41} + 2} \right] = \frac{7.75 - D}{5.75}$$

$$\frac{\frac{(La)^{0.41}}{846^{0.41}}}{\frac{(La)^{0.41}}{846^{0.41}} + \frac{2(846)^{0.41}}{846^{0.41}}} = \frac{7.75 - D}{5.75}$$

$$\frac{(La)^{0.41}}{(La)^{0.41} + 2(846)^{0.41}} = \frac{7.75 - D}{5.75}$$

$$(La)^{0.41} = \left[ \frac{7.75 - D}{5.75} \right][(La)^{0.41} + 2(846)^{0.41}]$$

$$(La)^{0.41}\left[1 - \left(\frac{7.75 - D}{5.75}\right)\right] = \left(\frac{7.75 - D}{5.75}\right)2(846)^{0.41}$$

$$(La)^{0.41} = \left(\frac{7.75 - D}{D - 2}\right)2(846)^{0.41}$$

$$\log(L) = \left(\frac{1}{0.41}\right)\log\left[\left(\frac{7.75 - D}{D - 2}\right)2(846)^{0.41}\right] - \log(a)$$

Figure 10:
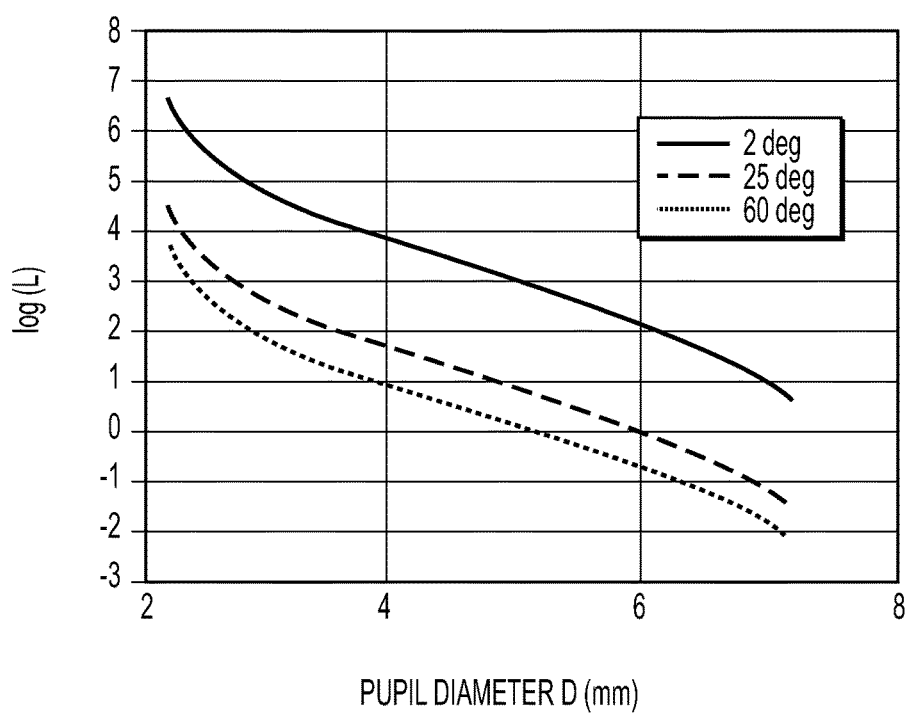

FIG. 10 illustrates an example of a plot of the log(L) function versus the pupil diameter for several fields of view areas ("a") as described in the solved for equation described above.

The above shows that taking a log of the function described above results in a plot that does not resemble the unified line shown in FIG. 9. Thus, the mere taking of a log of luminance, L, is not the correct way to implement a system according to the aspects disclosed herein because the eye also responds to the field of view ("a").

A corrected version is shown below:

$$\log(La) = \left(\frac{1}{0.41}\right)\log\left[\left(\frac{7.75 - D}{D - 2}\right)2(846)^{0.41}\right]$$

Figure 11:
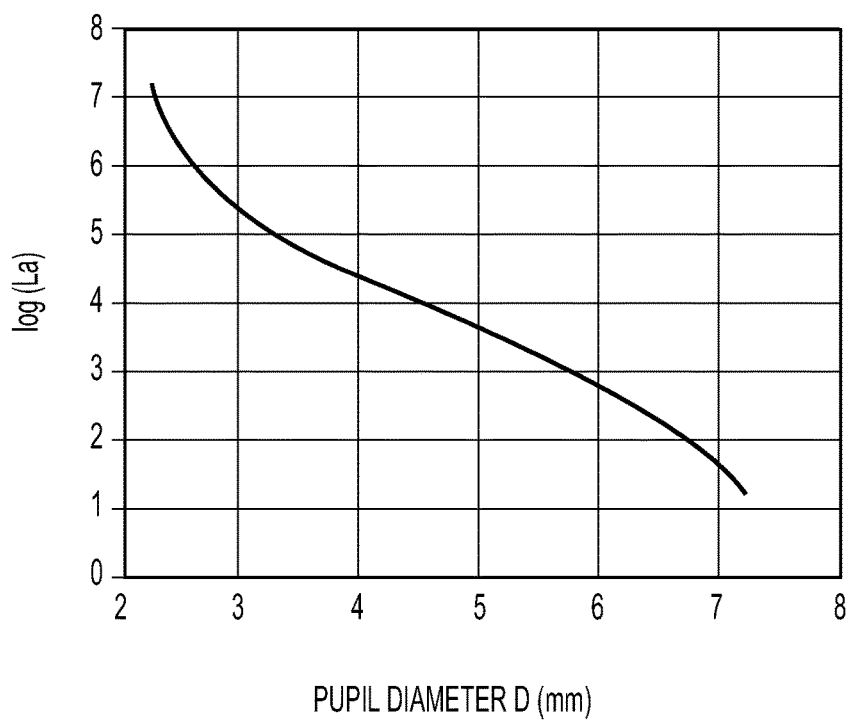

FIG. 11 illustrates an example of a plot according to an exemplary embodiment of block 420.

In another example, the block 420 may be further modified to adjust for an age associated with the pupil image (i.e. the age of the person). A relationship, the Stanley Davies function, allows for an adjustment for age. The mathematical manipulations that may be performed are the following:

$$D_U = D_{SD} + (y - y_0)[0.02132 - 0.009562 D_{SD}] \text{ wherein:}$$

y=age in years and $y_o$=is a constant (28 years) and $D_U$ stands for the unified "Stanley Davies" function including the age factors. Using the age of the viewer a y=28.58 years then the formula becomes equation shown above.

$$D_U = D_{SD} + (y - y_0)(0.02132) - (y - y_0)(0.009562) D_{SD}$$

$$D_U = D_{DS}[1 - (y - y_0)(0.009562)] + (y - y_0)(0.02132)$$

The following expressions may be employed to simplify the above expression:

$$D = D_U$$

$$F1 = 1 - (y - y_0)(0.009562)$$

$$F2 = (y - y_0)(0.02132)$$

Resulting in:

$$D = D_{SD} F1 + F2$$

Placing the above formula into the Stanley Davies relationship leads to:

$$D = \left[ 7.75 - 5.75 \left( \frac{(La/846)^{0.41}}{(La/846)^{0.41} + 2} \right) \right] F1 + F2$$

Similarly as performed above, log(La) can be solved for:

$$5.75 \left( \frac{(La/846)^{0.41}}{(La/846)^{0.41} + 2} \right) F1 = 7.75 F1 + F2 - D$$

$$\left( \frac{(La/846)^{0.41}}{(La/846)^{0.41} + 2(846/846)^{0.41}} \right) = \frac{7.75 F1 + F2 - D}{5.75 F1}$$

$$\frac{(La)^{0.41}}{(La)^{0.41} + 2(846)^{0.41}} = \frac{7.75 F1 + F2 - D}{5.75 F1}$$

$$F3 = \frac{7.75 F1 + F2 - D}{5.75 F1}$$

$$(La)^{0.41} = F3[(La)^{0.41} + 2(846)^{0.41}]$$

$$(La)^{0.41} = F3(La)^{0.41} + F3(2)(846)^{0.41}$$

$$(La)^{0.41}[1 - F3] = F3(2)(846)^{0.41}$$

$$(La)^{0.41} = \frac{F3(2)(846)^{0.41}}{1 - F3}$$

$$F4 = \frac{F3(2)(846)^{0.41}}{1 - F3}$$

$$(La)^{0.41} = F4$$

$$0.41 \log(La) = \log(F4)$$

$$\log(La) = \left(\frac{1}{0.41}\right)\log(F4)$$

$$F4 = \frac{\left(\frac{7.75 F1 + F2 - D}{5.75 F1}\right) 2(846)^{0.41}}{1 - \left(\frac{7.75 F1 + F2 - D}{5.75 F1}\right)}$$

$$F4 = \frac{\left(\frac{7.75 F1 + F2 - D}{5.75 F1}\right) 2(846)^{0.41}}{\frac{5.75 F1}{5.75 F1} - \left(\frac{7.75 F1 + F2 - D}{5.75 F1}\right)}$$

$$F4 = \frac{(7.75 F1 + F2 - D) 2(846)^{0.41}}{5.75 F1 - 7.75 F1 - F2 + D}$$

$$F4 = \frac{(7.75 F1 + F2 - D) 2(846)^{0.41}}{D - 2F1 - F2}$$

-continued $$F4 = \frac{\left[\frac{7.75[1-(y-y_0)(0.009562)] +}{(y-y_0)(0.02132) - D}\right]2(846)^{0.41}}{D - 2[1-(y-y_0)0.009562] - (y-y_0)(0.02132)}$$

$$F4 = \frac{\left[\frac{7.75 - 7.75(y-y_0)(0.009562) +}{(y-y_0)(0.02132) - D}\right]2(846)^{0.41}}{D - 2 + 2(y-y_0)(0.009562) - (y-y_0)(0.02132)}$$

$$F4 = \frac{[7.75 - D - 0.05279(y-y_0)]2(846)^{0.41}}{D - 2 - 0.0022(y-y_0)}$$

$$\log(La) = \left(\frac{1}{0.41}\right)\log\left[\frac{\left[\frac{7.75 - D -}{0.05279(y-y_0)}\right]2(846)^{0.41}}{D - 2 - 0.0022(y-y_0)}\right]$$

$$\log(La) = \left(\frac{1}{0.41}\right)\log\left[\left(\frac{6.091338 - D}{D - 2.069124}\right)\right] + 3.66159$$

Figure 12:
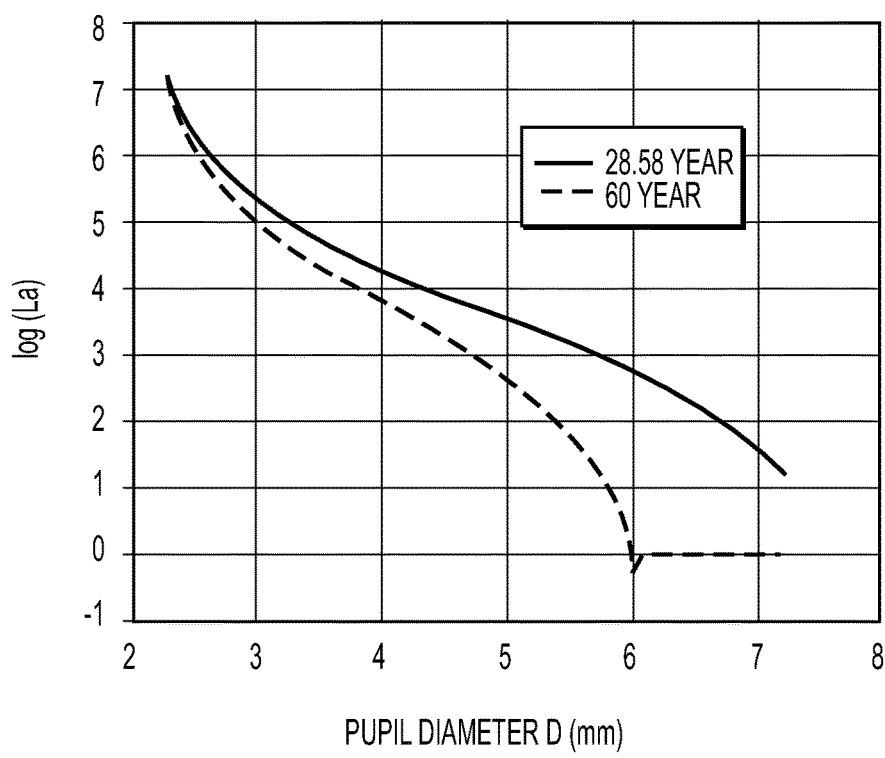

FIG. 12 illustrates an example of the above described expression employed with a sample case of a 28.5 year old and a 60 year old. Thus, the function to perform the logarithmic manipulation may be age dependent according to the manipulations shown within.

The y term may be set by an implementer. In one example, the term is set to 28.5, and the graph in FIG. 12 reflects this setting. In another example, the term is set to 60, and the graph in FIG. 12 also shows this setting.

Figure 13B:
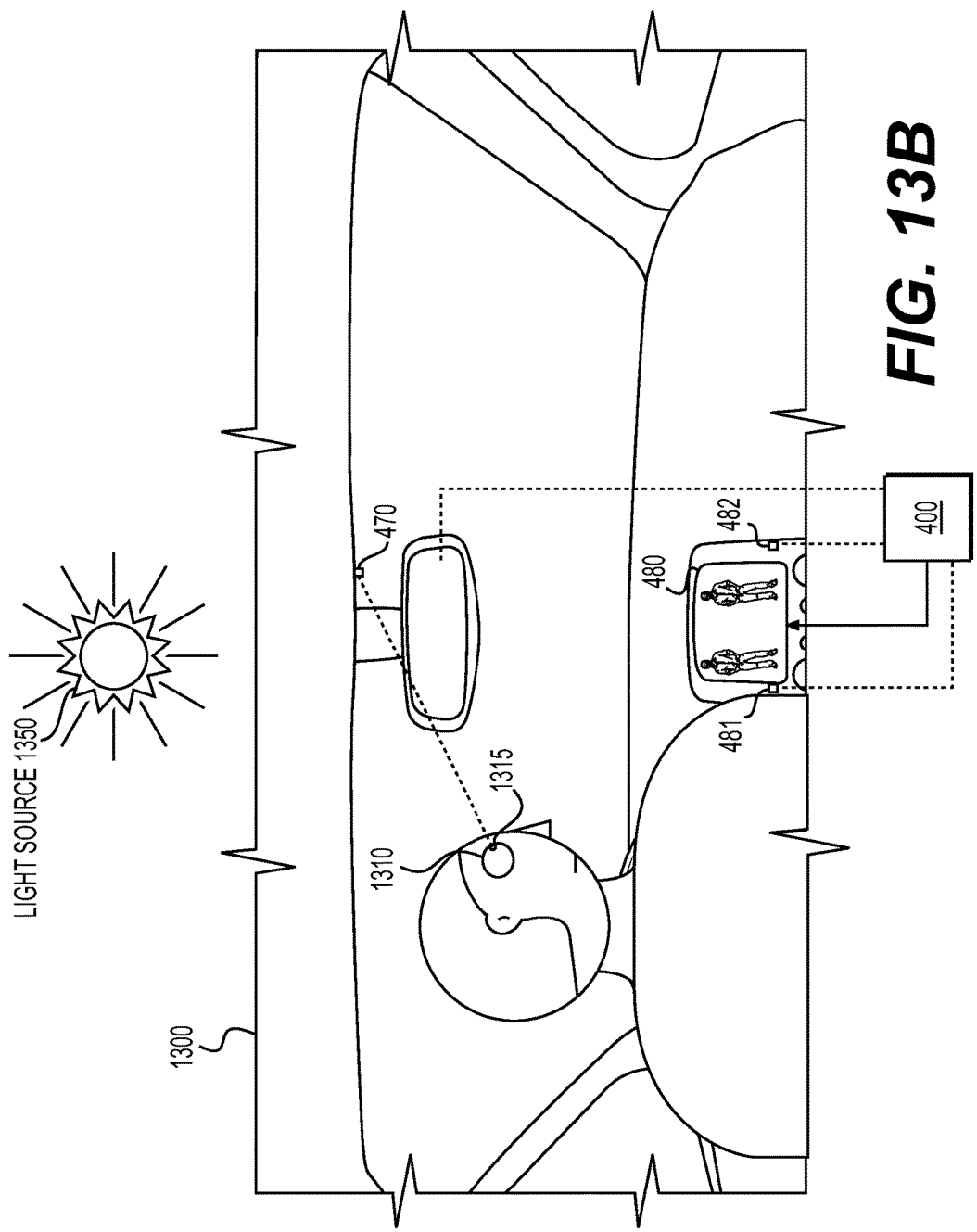
FIGS. 13(a) and (b) illustrate an example implementation of the system described above.

FIGS. 13(a) and (b) illustrate an example implementation of the system 400 described above. Also shown is a gaze tracking device 470. The gaze tracking device 470 may be implemented with concepts discussed above with regards to FIGS. 9-12.

As shown FIGS. 13(a) and (b), a vehicle 1300 is shown, and implemented along with a gaze tracking device 470. The gaze tracking device 470 is configured to capture an image of a person 1310's pupil 1315. As explained above, system 400 captures an image of pupil 1315, and translates the size of the diameter into a logarithmic component (as explained above), and combines the data with an ambient light sensor reading from one of the ambient light sensors 481 and 482 (or both). The information is employed by system 400 to adjust and determine a luminance of the display 480 (along with a user bias as well).

A light source 1350 is shown. The light source 1350 may reflect the environmental light conditions, such as the Sun, the Moon, ambient lighting from a street lamp, or the like. Thus, depending on the location or time, the light source 1350 may produce a different amount of light.

As shown in FIGS. 13(a) and (b), the light source 1350 may produce a different amount of light. Thus, according to the aspects disclosed herein, the detected pupil size (which is different in both figures), may cause the display 480 to adjust in luminance.

The display 480 is shown as an installed digital screen as part of a dashboard. However, as explained above, and implementation with a HUD may also be realized.

The aspects disclosed above are shown in operation with a vehicle. However, the concepts associated with system 400 may be applied to numerous display implementations.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for adjusting an electronic display, comprising:
   a gaze tracking device to capture an image of a pupil associated with a viewer of the electronic display, and a diameter of the pupil being ascertained via the image of the pupil;
   an ambient light sensor receiver to logarithmically receive light information from an ambient light sensor; and
   a display adjuster to adjust a luminance of the electronic display based on a combination of the diameter of the pupil and the light information,
   wherein the light information is transformed via an analog-to-digital (A/D) process,
   the light information, after undergoing the A/D process, is combined with a display user bias to produce an output.

2. The system according to claim 1, wherein the output is combined with a transformed version of the pupil diameter to produce a gain factor.

3. The system according to claim 2, wherein the gain factor is employed to perform the adjustment of the electronic display.

4. The system according to claim 1, wherein the diameter of the pupil undergoes a logarithmic transformation.

5. The system according to claim 4, wherein the logarithmic transformation is defined by an expression relating the La and the D,
   where La is the luminance per viewing area; and
   D is the diameter of the pupil.

6. The system according to claim 5, wherein the logarithmic transformation is further adjusted for an age associated with the pupil.

7. A system for adjusting a heads-up display (HUD), comprising:
   a gaze tracking device to capture an image of a pupil associated with a viewer of the electronic display, and a diameter of the pupil being ascertained via the image of the pupil;
   the system is configured to transform the diameter of the pupil with a logarithmic transformation; and
   a display adjuster to adjust a luminance of the HUD based on transformed diameter of the pupil,
   wherein the logarithmic transformation is defined by an expression relating the La and the D,
   where La is the luminance per viewing area; and
   D is the diameter of the pupil.

8. The system according to claim 7, wherein the display adjuster adjusts the HUD further by a user bias.

* * * * *